United States Patent [19]
Johnson

[11] 3,771,581
[45] Nov. 13, 1973

[54] TIRE IRON

[76] Inventor: George A. Johnson, Saugus, Calif.

[22] Filed: June 30, 1972

[21] Appl. No.: 267,890

[52] U.S. Cl. ................................ 157/1.22, 157/1.3
[51] Int. Cl. ............................................ B60c 25/00
[58] Field of Search .................. 157/1.3, 1.17, 1.22, 157/1.26, 1.28

[56] References Cited
UNITED STATES PATENTS

| | | | |
|---|---|---|---|
| 2,565,216 | 8/1951 | Fox | 157/1.3 |
| 1,233,012 | 7/1917 | Ashbaugh | 157/1.17 |
| 2,399,146 | 4/1946 | Schumann | 157/1.3 |
| 834,908 | 11/1906 | Hussey | 157/1.3 |

Primary Examiner—Granville Y. Custer, Jr.
Assistant Examiner—Harold P. Smith, Jr.
Attorney—Daniel T. Anderson

[57] ABSTRACT

A tire iron for removing a tire from the rim of its wheel or for replacing the tire on the wheel. The tire iron is of elongated form and has one end portion which is adapted for gripping it with the hand of the user. The opposed end portion is provided with a groove extending transversely through the tire iron. This groove is adapted to be inserted into the rim of the wheel so that the bead of the tire may be displaced. The tire iron is provided with a flat face substantially at right angles to the groove so that the tire iron may be hammered by a suitable instrument along the rim of the wheel thereby to displace the bead of the tire to release the tire. The tire iron may also be provided with an element which is slidable over the groove. It may be locked to the tire iron in either its retracted or extended position thereby to facilitate guiding of the tire iron over the rim of the wheel. The tire iron preferably consists of a non-scratching metal such, for example, as aluminum or it may be coated with or have an insert of a nonscratching, "self lubricating" plastic, such as Teflon.

2 Claims, 8 Drawing Figures

Patented Nov. 13, 1973
3,771,581
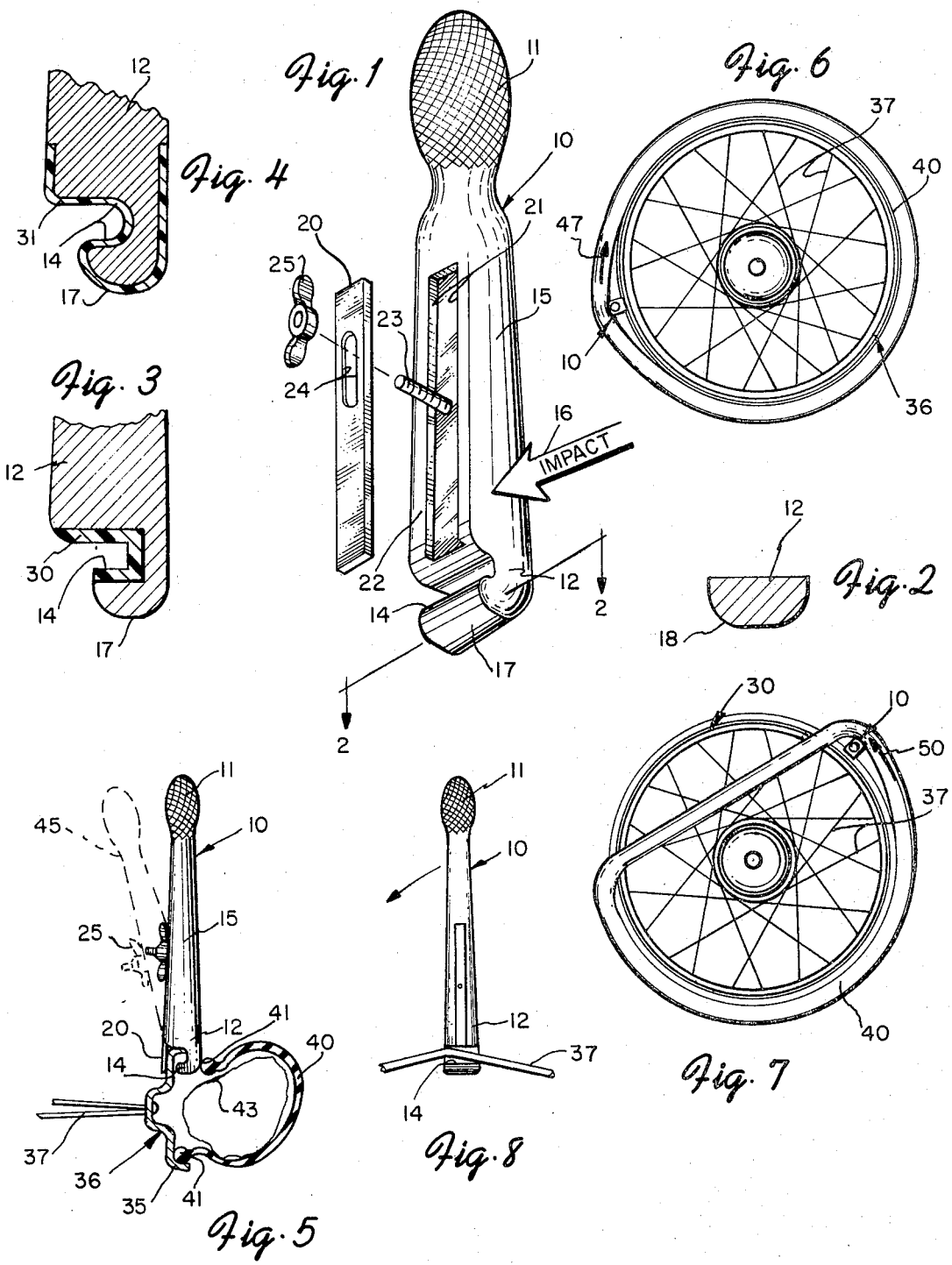

TIRE IRON

BACKGROUND OF THE INVENTION

This invention relates generally to tire irons, and particularly relates to a tire iron suitable for removing the tire from the wheel of a motorcycle and for replacing it.

In the past, it has usually been difficult to remove a tire with an inner tube from its wheel. This is particularly true of the wheels of motorcycles which are conventionally provided with an inner tube. Frequently a sharp instrument such, for example, as a screwdriver is inserted between the bead of the tire and the rim of the wheel. Unless this is done very carefully there is a great danger that the inner tube may be damaged. Furthermore, it was usually necessary to use two instruments spaced apart so that the portion of the tire which had already been removed from the wheel would not accidentally snap back again.

Accordingly there is a need for a better tire iron which would make it possible to remove a tire from its wheel without danger of damage to the inner tube. This is particularly important during trips into desolate, off-highway areas such, for example, as the desert.

It is accordingly an object of the present invention to provide an improved tire iron for removing by means of a single instrument a tire and its inner tube from the rim of its wheel substantially without danger of damaging the inner tube.

A further object of the present invention is to provide a tire iron of the type discussed which may be provided with a flat side so that it may be hammered by a rock or hammer along the circumference of the rim of the wheel so that the tire may be readily removed without the necessity of utilizing two separate tools.

Another object of the present invention is to provide a pocket size tire iron which is easy to use for one person and which includes a groove which may additionally be used for straightening out the spokes of the wheel.

SUMMARY OF THE INVENTION

In accordance with the present invention, there is provided a tire iron for removing a tire from the rim of the wheel or for replacing the tire on the wheel. The tire iron comprises an elongated body. This may, for example, consist of a metal such as aluminum, which does not scratch chrome or stainless steel. Alternatively, it may be fabricated substantially entirely of plastic or its working end may be coated with a tough, nonscratching plastic. One portion of the elongated body of the tire iron is adapted for gripping it by the hand of the user. The opposed end portion of the tire iron is provided with a transverse groove disposed adjacent the end of the body. This groove is adapted to be inserted over the tire bead retaining flange or lip of the rim of the wheel for displacing the bead of the tire as the tire iron is moved or impelled by pounding along the circumference of the rim of the wheel. The tire iron may include a slidable element which may be moved over the groove and is retractable therefrom. Its purpose is to maintain the iron in a predetermined position with respect to the rim of the wheel so that the bead of the tire is not likely to snap back into the wheel. There may be provided means for locking the element in an extended or retracted position with respect to the body which may, for example, consist of a threaded bolt extending from the tire iron and a suitable wing nut for locking the element.

The novel features that are considered characteristic of this invention are set forth with particularity in the appended claims. The invention itself, however, both as to its organization and method of operation as well as additional objects and advantages thereof would best be understood from the following description when read in connection with the accompanying drawing.

BRIEF DESCRIPTION OF THE DRAWING

FIG. 1 is an exploded view of the tire iron of the invention with its lockable positioning element and wing nut;

FIG. 2 is a sectional view taken on line 2—2 of FIG. 1 and illustrating the rounded bottom portion of the tire iron;

FIG. 3 is a cross-sectional view through the end portion of a tire iron showing a plastic insert for protecting the rim of the wheel on which the instrument is used and illustrating an alternative construction of the instrument;

FIG. 4 is a cross-sectional view similar to that of FIG. 3 and illustrating a plastic coating extending over the entire end portion of the instrument and illustrating still another modification of the instrument of the invention;

FIG. 5 is a side-elevational view showing the tire iron of the invention being used for removing a tire which is shown in cross section along with a portion of its wheel;

FIG. 6 is a side-elevational view of a wheel with a tire showing the instrument of the invention inserted into the rim of the wheel;

FIG. 7 is a side elevational view of a wheel with a tire, the tire being partly removed in a position where it may be put back on the wheel; and FIG. 8 is an elevational view of the tire iron of the invention being used for straightening a bent spoke of a wheel.

DESCRIPTION OF THE PREFERRED EMBODIMENTS

Referring now to the drawings and particularly to FIG. 1 there is illustrated by way of example a tire iron embodying the invention shown at 10. The tire iron 10 preferably consists of metal which may be a nonscratching metal such, for example, as aluminum. Alternatively, the tire iron may be at least partially coated with or be fabricated essentially totally from a plastic as will be explained hereinafter in connection with FIGS. 3 and 4. The tire iron 10 has one end portion 11 which may be adapted for gripping it by the hand of the user. This has been shown in FIG. 1 as formed of a rounded end portion which may be knurled and shaped to fit the hand.

The opposed end portion 12 of the tire iron 10 is provided with a groove 14 which extends transversely through the body. It is disposed substantially normal to a flat face 15 of the tire iron which is adapted to receive an impact shown by the arrow 16. Thus the instrument may be pounded, for example, by a hammer or rock or other suitable blunt object for a purpose which will be explained subsequently. The outer end 17 of the end portion 12 may be rounded, as shown, in a direction at right angles to the flat face 15. As shown in FIG. 2, the end portion 12 may also be rounded between the flat face 15 and the opposed face of the tire iron, so as to minimize any possible damage either to the tire and its inner tube or to the wheel and its rim.

Furthermore, the instrument is preferably provided with a substantially rectangular positioning or guiding element 20 which has the purpose to facilitate maintaining the tire iron in a predetermined position with respect to the rim of the wheel. The element 20 is preferably slidable over the groove 14 and may be locked in an extended or retracted position. Thus, the element 20 may slide in a rectangular recess 21 disposed in the face 22 of the tire iron adjacent the groove 14. The recess 21 is of a size to accommodate the element 20. There may also be provided a fixed threaded bolt 23 protruding from the tire iron 10 and extending through an elongated slot 24 in the element 20. Thus, the element 20 may be put into the recess 21 and may then be locked in either retracted or extended position by means of the wing nut 25.

Before proceeding to a description of the manner of operating the tire iron, reference is now made to FIG. 3 which shows an alternative embodiment of the tire iron of the invention. The end portion 12 of the tire iron is provided again with the groove 14. However, a plastic insert 30 extends over the entire groove 14. The plastic material 30 may, for example, consist of Teflon or any other "self-lubricating" tough plastic which will not scratch the rim of the wheel.

Another alternative embodiment is illustrated in FIG. 4. Here the outer end of the opposed end portion 12 is coated with a plastic coating 31 which also covers the rounded outer end 17. Again, the plastic coating 31 may, for example, consist of Teflon or any other non-scratching tough material. The advantage of utilizing either a plastic insert 30 or a plastic coating 31 is that it is possible to utilize a harder metal such, for example, as steel without the danger of damaging the tire or wheel.

Referring now to FIG. 5, there is illustrated the tire iron 10 inserted by its groove 14 into the rim 35 of a wheel 36 having spokes 37. The tire 40 is provided in a conventional manner with two tire beads 41 which are usually reinforced, for example, with metal so that the tire beads 41 are safely retained by the wheel rim 35. There may also be provided an inner tube 43.

Thus, as shown in FIG. 5, the groove 14 of the tire iron 10 is inserted or forced between the rim 35 of the wheel 36 and the bead 41 of the tire 40. As shown in FIG. 5, this will now displace the bead 41 so that the tire may be removed. When a plastic coated or otherwise self-lubricated embodiment is not being used, it may be desired to apply an appropriate rubber lubricant to the bead portion of the tire to facilitate the displacement of the bead over the rim flange and the travel of the iron 10 peripherally therealong.

This is effected by pounding the flat face 15 with a hammer, rock or the like as shown by arrow 16 in order to facilitate driving the tire iron along the circumference of the rim 35. The guiding element 20 may be extended over the groove 14 as shown in FIG. 5. In order to insure that the tire bead 41 is safely removed from the wheel rim 35, the tire iron 10 may be put at a slight angle as shown in dotted lines at 45 in FIG. 5.

Initially, the tire iron 10 is in the position shown, for example, in FIG. 6 and may be pounded or moved in the direction of arrow 47. Eventually, the tire 40 is in a position illustrated in FIG. 7 whereupon the tire may safely be removed.

In order to replace the tire, it may initially be put in the position shown in FIG. 7 with the tire iron 10, also as shown in FIG. 7. The tire iron is now pounded in the direction of arrow 50 which will eventually force back all of the tire 40 with its inner tube 43 between the two rims 35 of the wheel 36.

The tire iron 10 is thus pounded in the direction of the arrow 50 until the entire tire 40 with its inner tube 43 is returned into the wheel between the two rims 35.

It is also feasible as illustrated in FIG. 8 to use the groove 14 of the tire iron 10 to straighten out a spoke 37 that may have become bent. In most cases, the size of the groove 14 would just about fit over one of the spokes 37.

There has thus been disclosed a tire iron particularly adapted for either removing or replacing a tire and its inner tube from the wheel of a motorcycle. The instrument is so designed that it permits removal of a tire by a single pocket sized instrument. It also minimizes danger of damage to either the tire or its inner tube. The instrument permits keeping the tire bead from popping back into place until the entire tire may be removed from its wheel and either replaced or fixed. The groove of the tire iron may additionally be used for straightening out bent spokes or the like.

What is claimed is:

1. A tire iron for removing a tire from the rim of its wheel or for replacing the tire on the wheel, said tire iron comprising:
    a. an elongated metal body having one end portion adapted for gripping it by the hand of the user and having an opposed end portion, said opposed end portion being provided with a groove extending transversely through said body and disposed adjacent the end of the body, said groove being adapted to be inserted into the rim of the wheel over the tire bead retaining flange portion thereof for displacing the bead of the tire when moved circumferentially along the rim of the wheel;
    b. said metal body being provided with an insert of a plastic material extending substantially over said groove;
    c. an element slidable over said groove and retractable therefrom for maintaining said elongated body in a predetermined position with respect to the rim of the wheel; and
    d. means on said body for locking said element in an extended or retracted position with respect to said body.

2. A tire iron as defined in claim 1 wherein substantially all of said opposed end portion is coated with a plastic material.

* * * * *